United States Patent
Kim

(10) Patent No.: US 9,690,132 B2
(45) Date of Patent: Jun. 27, 2017

(54) LIQUID CRYSTAL DISPLAY DEVICE

(71) Applicant: BOE TECHNOLOGY GROUP CO., LTD., Beijing (CN)

(72) Inventor: Kiman Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 145 days.

(21) Appl. No.: 13/944,990

(22) Filed: Jul. 18, 2013

(65) Prior Publication Data
US 2014/0063413 A1 Mar. 6, 2014

(30) Foreign Application Priority Data
Sep. 6, 2012 (CN) .......................... 2012 1 0328751

(51) Int. Cl.
*G02F 1/1335* (2006.01)
*F21V 8/00* (2006.01)

(52) U.S. Cl.
CPC ..... *G02F 1/133504* (2013.01); *G02B 6/0035* (2013.01); *G02F 1/133514* (2013.01); *G02F 1/133512* (2013.01); *G02F 2001/133562* (2013.01)

(58) Field of Classification Search
CPC ......... G02F 1/133615; G02F 1/133504; G02F 1/133514; G02F 1/133512; G02F 2001/133562; G02B 6/0068; G02B 6/0035
USPC ........................................................ 349/65
See application file for complete search history.

(56) References Cited

U.S. PATENT DOCUMENTS

| 5,990,993 | A | * | 11/1999 | Haas | G02F 1/133504 |
| | | | | | 349/110 |
| 6,288,760 | B1 | | 9/2001 | Sawayama | |
| 2001/0008437 | A1 | * | 7/2001 | Fujimori | G02F 1/133555 |
| | | | | | 349/113 |
| 2005/0052732 | A1 | * | 3/2005 | Chen | G02B 21/36 |
| | | | | | 359/369 |

(Continued)

FOREIGN PATENT DOCUMENTS

| CN | 1195119 A | 10/1998 |
| CN | 101206330 A | 6/2008 |

(Continued)

OTHER PUBLICATIONS

First Chinese Office Action dated Jul. 2, 2014; Appln. No. 201210328751.7.

(Continued)

*Primary Examiner* — Nathanael R Briggs
*Assistant Examiner* — William Peterson
(74) *Attorney, Agent, or Firm* — Ladas & Parry LLP

(57) ABSTRACT

A liquid crystal display device is provided. The liquid crystal display device comprises a backlight module and a display panel. The display panel includes an array substrate disposed on the light entering face side, a color filter substrate disposed on the light exiting face side and a liquid crystal layer between the two substrates. On the array substrate, there is provided a first polarizing plate. The color filter substrate includes a base substrate, a second polarizing plate disposed on the light exiting face side of the base substrate and a color filter layer disposed on the light exiting face side of the second polarizing plate. The backlight module is a collimated backlight module.

15 Claims, 5 Drawing Sheets

(56) References Cited

U.S. PATENT DOCUMENTS

| | | | | |
|---|---|---|---|---|
| 2007/0020792 | A1* | 1/2007 | Hasei | B29D 11/00365 |
| | | | | 438/30 |
| 2009/0129116 | A1* | 5/2009 | Kim | G02B 6/0035 |
| | | | | 362/606 |
| 2009/0161035 | A1 | 6/2009 | Shao et al. | |
| 2010/0283940 | A1 | 11/2010 | Takemoto et al. | |
| 2011/0051041 | A1* | 3/2011 | Yashiro | G02B 6/0061 |
| | | | | 349/62 |
| 2011/0116004 | A1* | 5/2011 | Takahashi | G02B 5/305 |
| | | | | 349/61 |
| 2012/0019740 | A1* | 1/2012 | Kadowaki | G02B 5/201 |
| | | | | 349/61 |

FOREIGN PATENT DOCUMENTS

| | | | |
|---|---|---|---|
| CN | 101435893 A | | 5/2009 |
| CN | 101821667 A | | 9/2010 |
| CN | 102356348 A | | 2/2012 |
| CN | 102472912 A | | 5/2012 |
| TW | I286641 B | | 9/2007 |
| WO | WO2007100143 | * | 9/2007 |
| WO | WO2011004906 | * | 1/2011 |

OTHER PUBLICATIONS

Second Chinese Office Action Appln. No. 201210328751.7; Dated Dec. 9, 2014.

Third Chinese Office Action Appln. No. 201210328751.7; Dated Apr. 22, 2015.

* cited by examiner

LIQUID CRYSTAL DISPLAY DEVICE

BACKGROUND

Embodiments of the present invention relate to a liquid crystal display device.

Liquid crystal display devices are now being widely used due to their merits of thin thickness and light weight as compared with existing Cathode Ray Tube (CRT) display devices. As shown in FIG. 1, a conventional liquid crystal display device includes a backlight module 10 and a display panel 20. Further, the display panel 20 includes an array substrate 21, a color filter (CF) substrate 23 and a liquid crystal layer 25 filled between the two substrates. The liquid crystal display device is a passive display device, and in order to display pictures, the additional backlight module 10 is provided. On the array substrate 21, there are provided pixel structures (not shown), and in order to display color images, a color filter layer 26 that includes color filters of red (R), green (G) and blue (B) is provided on the color filter substrate 23 in correspondence with each of the pixel structures.

Because the image display needs linearly polarized light, on a light entering face (a face facing the backlight module 100) and a light exiting face (a face of the color filter substrate 23 away from the array substrate 21) of the traditional display panel 20, there are arranged a lower polarizing plate 22 and an upper polarizing plate 24, respectively. Polarization direction and exit amount of light that exits from the backlight module 10 is controlled by the two polarizing plates and the liquid crystal layer 25. Further, light that is transmitted by the lower polarizing plate 22 and the liquid crystal layer 25 will be transmitted by the upper polarizing plate 24 later after they pass through the color filter layer 26, so that the light is fully blocked or transmitted by the upper polarizing plate 24. Thereby, the display panel appears to be a dark state or a bright state. However, before the light is incident to the upper polarizing plate 24, a part of it is scattered upon passing through the liquid crystal layer 25 and the color filter layer 26, so that blocking of the incident light may not be achieved by the upper polarizing plate 202 or the incident light may not be transmitted by the upper polarizing plate 202. Thus, the dark state or the bright state cannot be realized favorably, and accordingly, contrast of the display panel is reduced dramatically. This is more serious especially for IPS and FFS mode display devices in which transverse electric fields are used for control of liquid crystals. To solve this problem, there are methods that properties of a liquid crystal material or size and morphology of pigment particles of color filters are changed, surface treatment is performed on pigment particles of color filters, and so on. However, with respect to each method, it is impossible that the problem of light scattering is avoided radically and then contrast of liquid crystal display devices is raised.

In addition, a color filter allows passage of light with a certain wavelength, and color filters of R, G, and B allow passage of lights with R, G and B wavelengths in an incident white light from the backlight module 10, respectively, namely, only ⅓ of the white light is used. Thus, light loss is large.

SUMMARY

According to an embodiment of the invention, there is provided a liquid crystal display device, comprising: a backlight module and a display panel, two surfaces of the display panel being a light entering face and a light exiting face, respectively, the backlight module facing the light entering face of the display panel, and light that is emitted from the backlight module entering the display panel from the light entering face, wherein, the display panel includes an array substrate disposed on the light entering face side, a color filter substrate disposed on the light exiting face side and a liquid crystal layer between the two substrates, on the array substrate, there is provided a first polarizing plate, the color filter substrate includes a base substrate, a second polarizing plate disposed on the light exiting face side of the substrate and a color filter layer disposed on the light exiting face side of the second polarizing plate, and the backlight module is a collimated backlight module.

In an example, the color filter layer includes color filters and black matrices that are disposed alternately in the in-plane direction of the color filter substrate and a protective layer that covers the color filters and the black matrices; a collimation angle θ of the backlight module meets:

$$\theta = \tan^{-1}\left(\frac{p}{d1+d2}\right)$$

wherein, d1 is the thickness of the base substrate, d2 is the thickness of the second polarizing plate, and p is the distance between centers of two adjacent black matrices.

In an example, the backlight module includes a light guide plate and a light source disposed on an end side of the light guide plate, wherein, on a light exiting face of the light guide plate, there is provided a grating, and the grating includes a plurality of strip-like structures that are disposed to be arranged parallel to each other with a set period Λ in a direction from the light source side to the opposite of the light source.

In an example, the color filter layer contains phosphors.

In an example, the set period Λ meets: 450 nm≥Λ≥200 nm.

In an example, over the color filter layer, there is further provided a light diffusion film having a light diffusing function, and particles having the light diffusing function are provided within the light diffusion film.

In an example, particles having a light diffusing function are further provided within the color filter layer.

In an example, the particles having the light diffusing function are contained in the color filters.

In an example, the particles having the light diffusing function are contained in the protective layer.

In an example, the light diffusion film has an interior haze and an exterior haze, and the exterior haze is less than 1%.

In an example, an interior haze value of the particles is in the range of 30% to 95%.

In an example, on the light diffusion film, there is provided an anti-reflection film.

In an example, on the protective layer, there is provided an anti-reflection film.

(3) Beneficial Effects

With respect to the liquid crystal display device according to embodiments of the invention, by way of adopting the collimated backlight module that uses a holographic light guide plate and the color filter layer that is located external to the upper polarizing plate, the utilization rate of light and contrast of the liquid crystal display device are raised; furthermore, by means of providing the light diffusion film on the color filter layer or making the color filter layer have a light diffusing function, the viewing angle of the liquid crystal display device is broadened.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which come(s) within the scope sought for protection by the invention.

Hereinafter, liquid crystal display devices proposed by embodiments of the invention will be described in detail in conjunction with accompanied drawings and embodiments.

Embodiment 1

Figure 1:
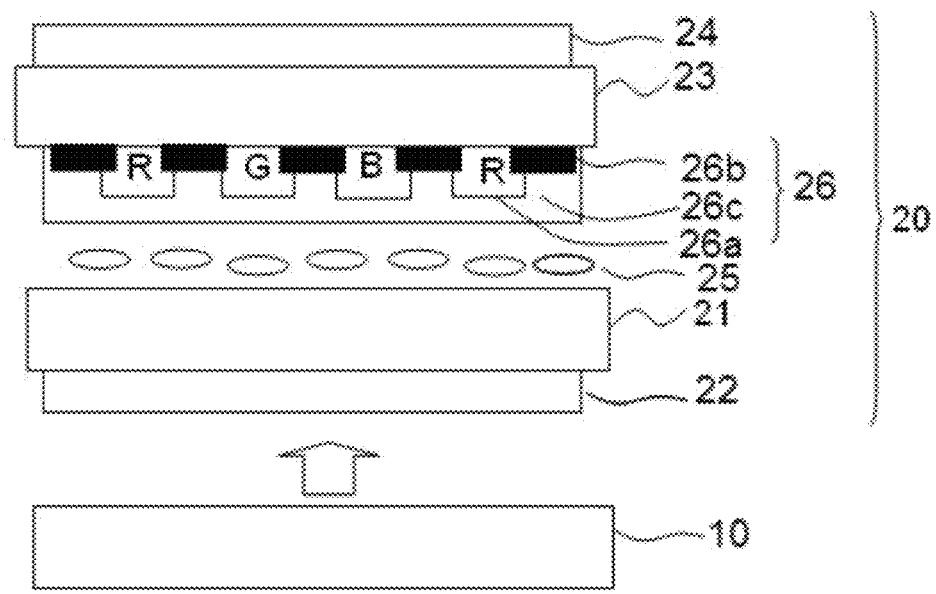
FIG. 1 is a structurally schematic view showing a conventional liquid crystal display device.
Figure 2:
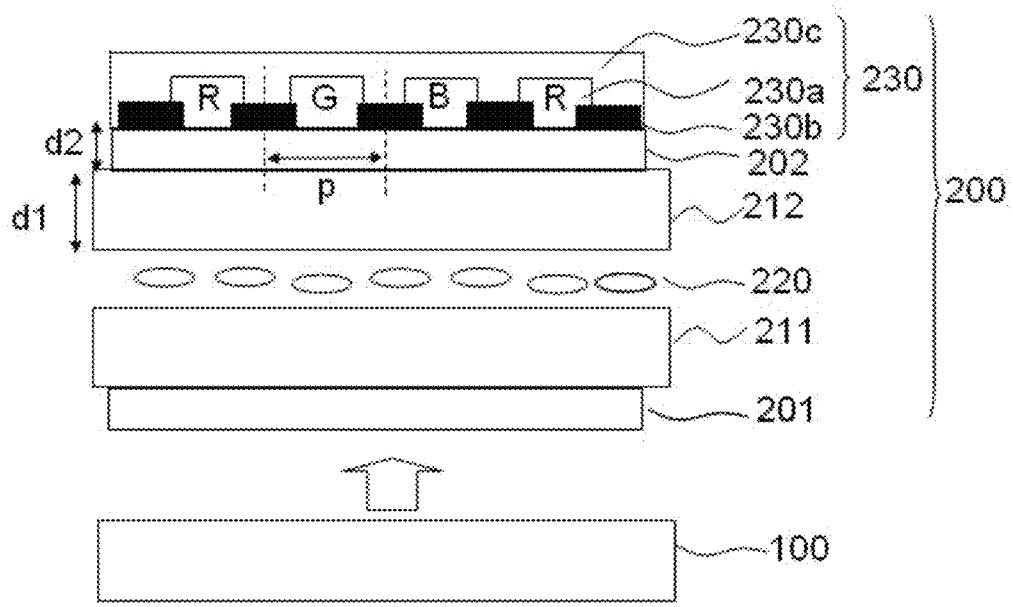
FIG. 2 is a structurally schematic view showing a liquid crystal display device according to embodiment 1.

As shown in FIG. 2, a liquid crystal display device according to the embodiment includes a backlight module 100 and a display panel 200. Where, the backlight module 100 is a collimated backlight module possessing a light-converging function. Further, the display panel 200 includes: an array substrate 211, a base substrate 212 of a color filter substrate and a liquid crystal layer 200 filled between the two substrates. A lower polarizing plate 201 is provided on a light entering face of the array substrate 211, and an upper polarizing plate 202 is provided on a light exiting face of the display panel 200. In the display device according to the embodiment, a color filter layer 230 is disposed external to the upper polarizing plate 202. The color filter layer 230 comprises color filters 230a, black matrices 230b and a protective layer 230c. As for the liquid crystal display device according to the embodiment, by means of placing the color filter layer 230 to be external to the upper polarizing plate 202, a problem that contrast of a liquid crystal panel is reduced due to scattering of light is prevented at its root.

For example, the color filter layer 230 comprises the color filters 230a and the black matrices 230b that are disposed alternately in the in-plane direction of the base substrate 212 of the color filter substrate and the protective layer 230c that covers the color filters 230a and the black matrices 230b.

In the liquid crystal display device according to the embodiment, it is necessary to select proper collimated backlight module 100, so that light passing through the liquid crystal layer 220 can pass through the color filter layer 230 of a corresponding pixel. Let the thickness of the base substrate 212 of the color filter substrate be d1, the thickness of the upper polarizing plate 202 be d2, and the distance between centers of two adjacent black matrices 203b be p, then collimation angle θ of the collimated backlight module 100 shall meet the following formula:

$$\theta = \tan^{-1}\left(\frac{p}{d1 + d2}\right) \quad (1)$$

For example, let the thickness d1 of the base substrate 212 of the color filter substrate be 300 μm, the thickness d2 of the upper polarizing plate 202 be 100 μm or so, and the distance p between centers of two adjacent black matrices 203b be 120 μm, then a collimated backlight module having a collimation angle within the range of ±17 degrees should be selected.

As can be seen from FIG. 2, two surfaces of the display panel 200 are a light entering face and a light exiting face, respectively. The backlight module 100 faces the light entering face of the display panel 200, and a light that is emitted from the backlight module 100 enters the display panel 200 from the light entering face. The array substrate 211 is disposed on the light entering face side of the display panel 200, and the base substrate 212 of the color filter substrate is disposed on the light exiting face side of the display panel 200.

The base substrate 212 of the color filter substrate as stated above and the color filter layer 230 disposed thereon constitute the color filter substrate, so as to realize the function of color filter substrate.

Embodiment 2

In order to attain the required collimation angle of the collimated backlight module in Embodiment 1, a holographic light guide plate is used in a liquid crystal display device in the embodiment. The holographic light guide plate comprises: a plate-shaped light guide plate through which light can travel, and a light source disposed on a side of the light guide plate, and it makes light, which comes out of the light source and is directed into the light guide plate from the side and travel via total reflection, exit from the light exiting face (a face facing a display panel) of the light guide plate as an area light source. While in order to extract the light that travels within the light guide plate to outside of the light guide plate, a grating is provided on the light exiting face or a reflecting face (a face in opposition to the light exiting face) of the light guide plate, and this light guide plate is called as the holographic light guide plate. In such a holographic light guide plate, the grating is provided on the light exiting face of the light guide plate, so that light that travels within the light guide plate exit out of the light guide plate through diffraction of the grating.

Figure 3:
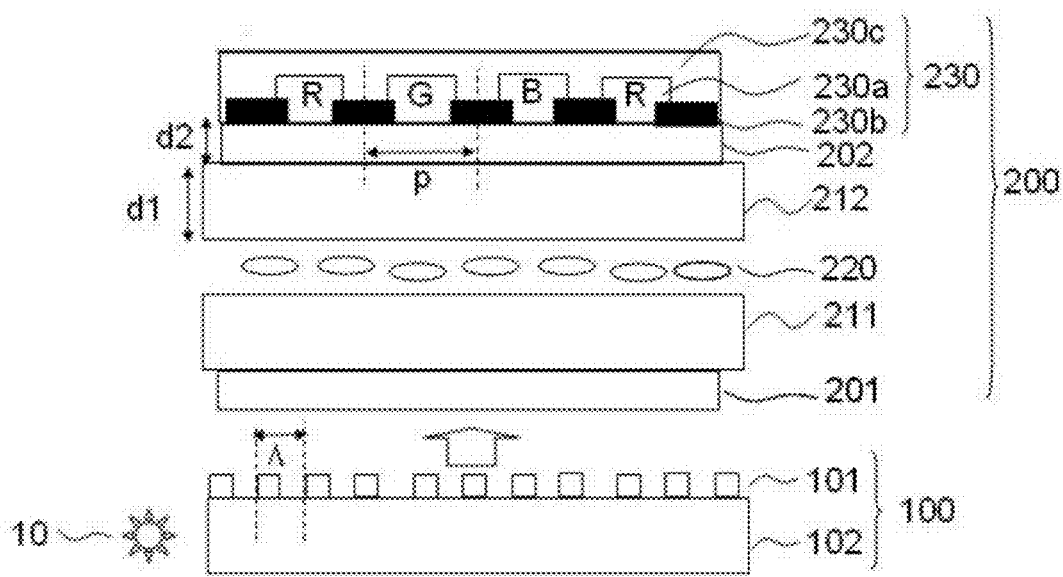
FIG. 3 is a structurally schematic view showing a liquid crystal display device according to embodiment 2.

An exit angle of the light that travels within the light guide plate is controlled by means of adjusting a period Λ of the grating on the holographic light guide plate, so that the light can be incident to the display panel at a desired angle. As shown in FIG. 3, in the liquid crystal display device according to the embodiment, a collimated backlight module 100 comprises a holographic light guide plate and a blue light source 10 disposed on a side of the holographic light guide plate. Further, the holographic light guide plate includes a plate-shaped light guide plate 102 and gratings 101 disposed on a light exiting face of the light guide plate 102 (which may also be disposed on a reflecting face of the light guide plate). The gratings 101 are strip-like structures that are formed of a dielectric or a metal and are disposed to be arranged parallel to each other with a set period Λ in a direction from an incident face of light to the opposite of the light source, and the period Λ meets: 450 nm≥Λ≥200 nm. In order that conversion from a blue light emitted by the blue light source 10 to a green light and a red light is achieved, phosphors are contained in color filters 230s in the device according to the embodiment. Specifically, the phosphors are contained in a green filter and a red filter, while no phosphor is contained in a blue filter section.

In the liquid crystal display device according to the embodiment, the main body of the light guide plate may be of polymethyl methacrylate (PMMA), polycarbonate (PC), or other material. For example, when the light guide plate 102 adopts PMMA whose refractivity is 1.49 and the light source 10 uses blue light with a wavelength of 450 nm, the collimation angle is about ±15 degrees or so in the case that Λ is about 340 nm, which meets the collimation scope of formula (1).

In the holographic light guide plate according to the embodiment, the gratings 101 can be made to have a plurality of diffraction regions with different extraction efficiencies of light along a certain direction by way of adjusting width and height of the gratings, and the extraction efficiency of the plurality of diffraction regions is such a case that the farther the region is apart from the light source, the higher the extraction efficiency is.

Embodiment 3

Figure 4:
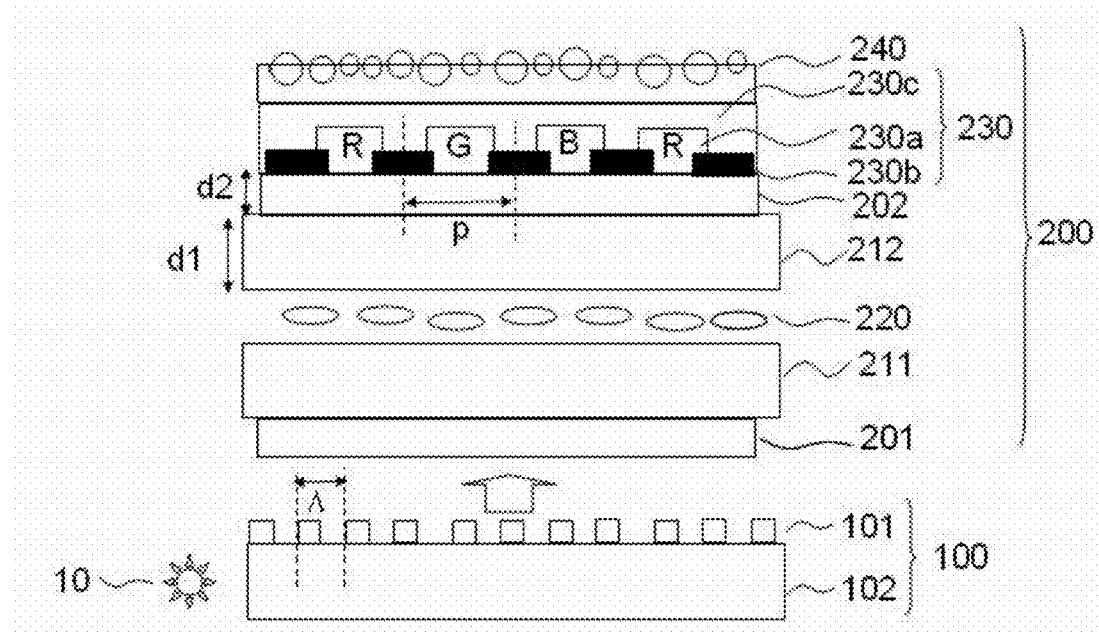
FIG. 4 is a schematic view showing a structure of a liquid crystal display device according to embodiment 3.
Figure 5:
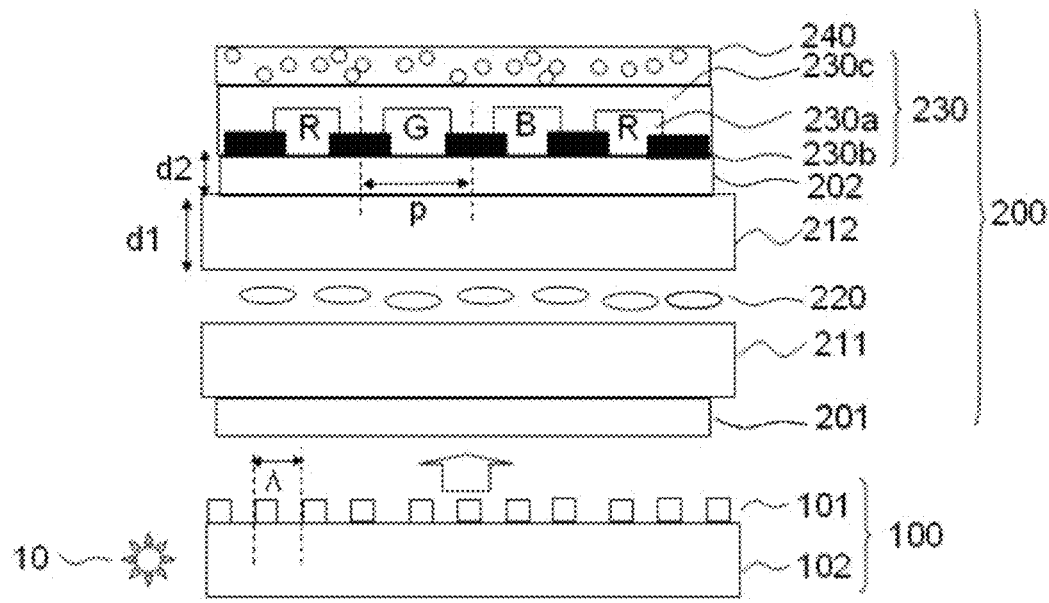
FIG. 5 is a schematic view showing another structure of the liquid crystal display device according to embodiment 3.

As shown in FIG. 4, based on the liquid crystal display device of Embodiment 2, a liquid crystal display according to the embodiment further includes a light diffusion film 240 disposed on the protective layer 230c, so as to solve possible narrow-viewing-angle problem brought out by light that is incident from the backlight module 100 and pass through the liquid crystal layer 220 and the color filter layer 230. Within the light diffusion film 240, there are provided particles having a light diffusing function, and the light diffusion film 240 may be a light diffusion sheet that has both the general morphology of an interior haze and the general morphology of an exterior haze. However, in the case that the exterior haze is 1% or more, an ambient light is scattered owing to the exterior haze of the light diffusion film 240, and this will lead to a problem of blur, especially, will reduce the contrast in a bright room. Therefore, more preferably, as shown in FIG. 5, it is possible to make the exterior haze kept to be less than 1%, and the light diffusion film 240 with a desired diffusion characteristic is shown merely by dint of the interior haze.

Embodiment 4

Figure 6:
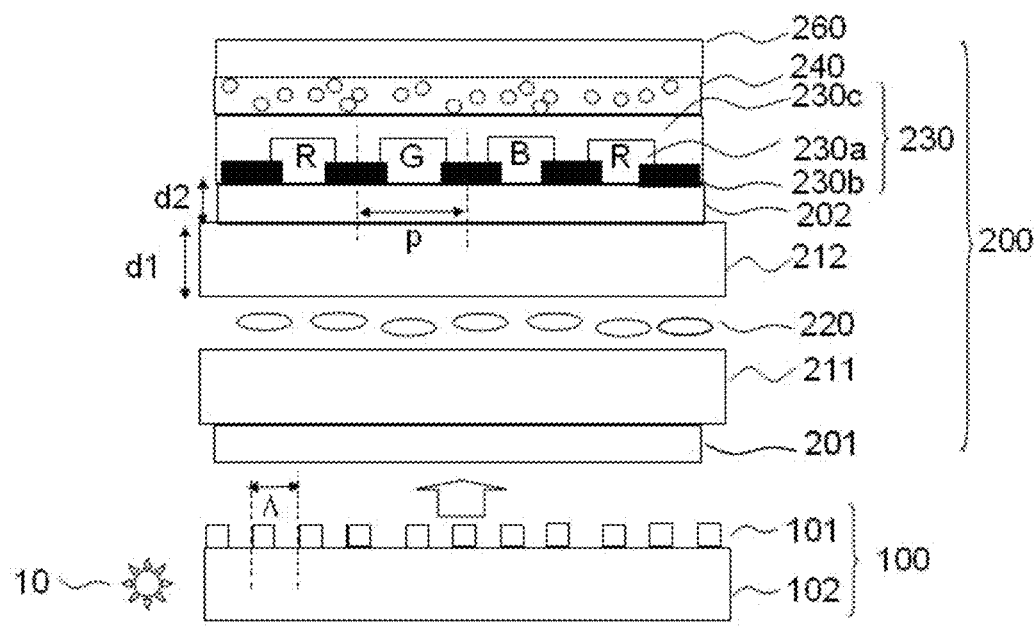
FIG. 6 is a structurally schematic view showing a liquid crystal display device according to embodiment 4.

As shown in FIG. 6, in a liquid crystal display according to the embodiment, on basis of the liquid crystal display device of Embodiment 3, an anti-reflection film (low reflection film) 260 is further provided on the light diffusion film 240, so as to reduce dazzle caused by external light.

Embodiment 5

A liquid crystal display device according to the embodiment is basically the same as the liquid crystal display device according to Embodiment 1 (may also be Embodiment 2) in structure, but differs from it in that, in the liquid crystal display device according to the embodiment, color filters 203a has a diffusion function, so that the viewing angle of the liquid crystal display device is broadened, and an additional light diffusion film is not required. Thus, the cost can be cut down, and the process becomes simple.

Figure 7:
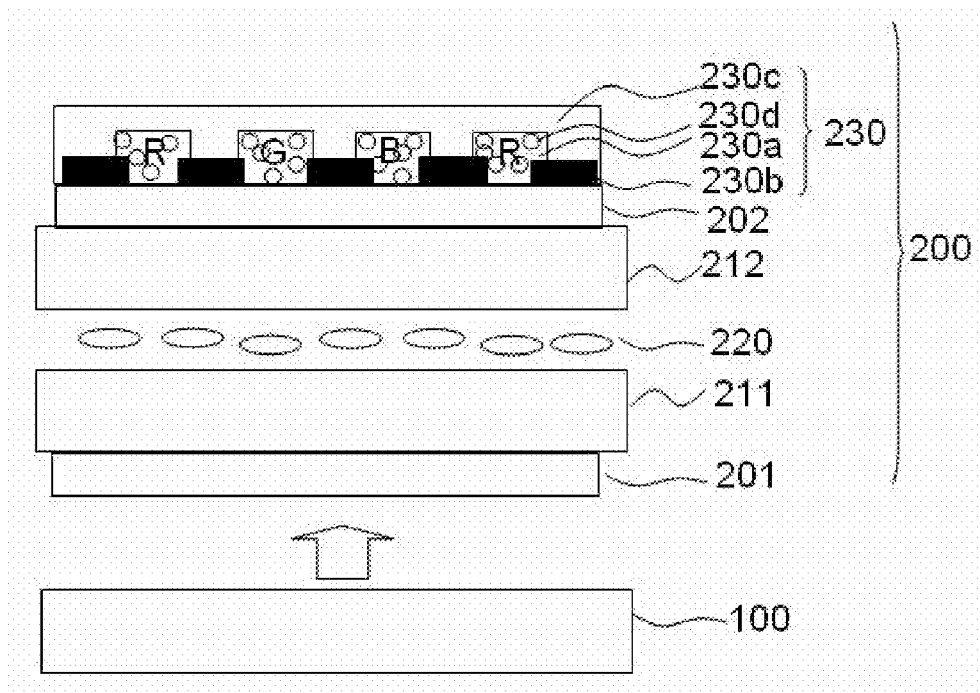
FIG. 7 is a structurally schematic view showing a liquid crystal display device according to embodiment 5.

As shown in FIG. 7, particles 203d having a light diffusing function are contained in the color filters 203a of the liquid crystal display according to the embodiment, so that the color filters 203a have the light diffusing function. And, in order that the light diffusing function of the liquid crystal display device in Embodiment 2 is realized, the interior haze value of the particles 230d is ≥30% and ≤95% (when the haze value is less than 30%, it is difficult to properly diffuse light of collimated backlight module, leading to a bad viewing angle; when the haze value is more than 95%, overmuch light is diffused, so that the interval of pixels is vague, and thereby a problem that picture quality of the liquid crystal display device becomes worse exists), preferably, ≥60% and ≤85%. The haze value is measured by utilizing a turbidity measuring instrument (HZ-1, manufactured by Suga Test Instrument Co., Ltd) for manufacture of a color filter layer on a transparent substrate and according to JIS K 7361-1 provision, and is calculated by the formula (haze (%)=diffused lights/all the transmitted lights×100).

It is to be noted that, there is no limit to the kind of particles having the light diffusing function, as long as they are not light absorbing substances. Namely, particles of common kinds of transparent resin can be used, such as polystyrene (PS), polymethyl methacrylate (PMMA), polycarbonate (PC), polypropylene (PP), polyethylene (PE), polyvinyl chloride (PVC), and so on.

Embodiment 6

Figure 8:
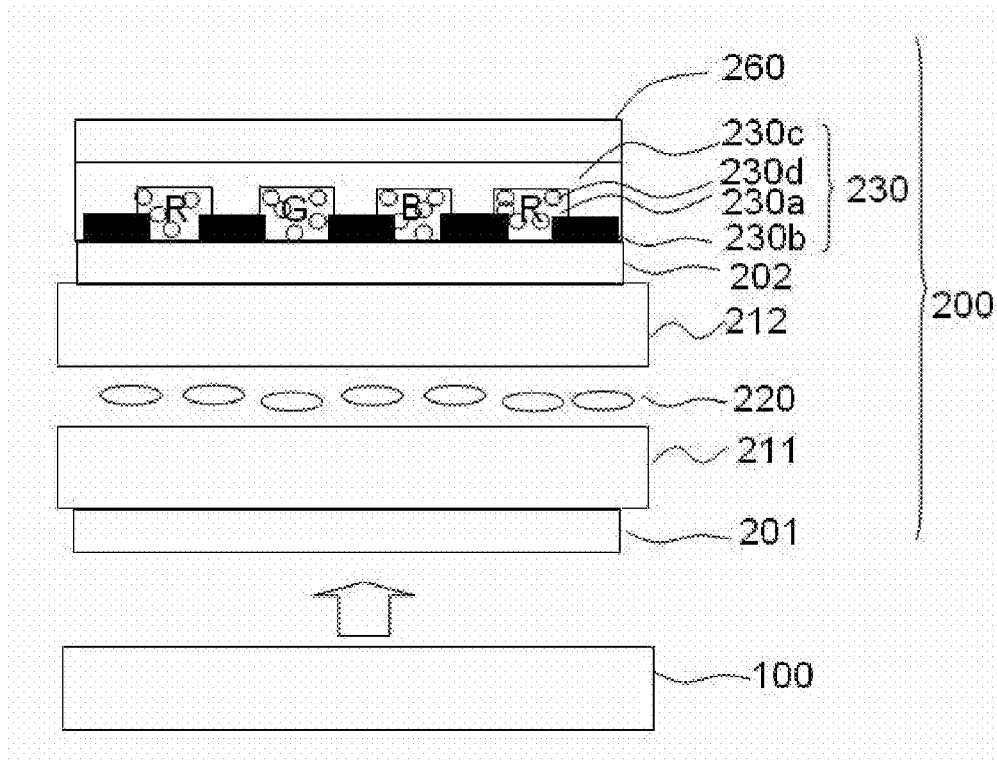
FIG. 8 is a structurally schematic view showing a liquid crystal display device according to embodiment 6.

As shown in FIG. 8, in a liquid crystal display device according to the embodiment, on the basis of the liquid crystal display device according to Embodiment 5, an anti-reflection film 260 is further provided on the color filter layer 230, so as to reduce dazzle caused by external light.

Embodiment 7

Figure 9:
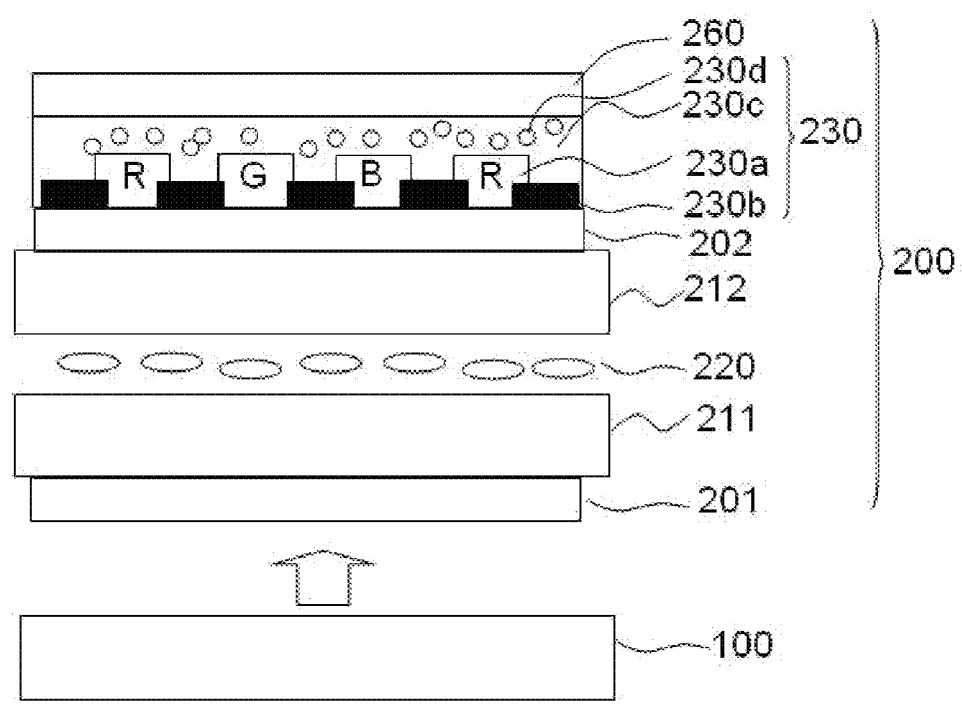
FIG. 9 is a structurally schematic view showing a liquid crystal display device according to embodiment 7.

As shown in FIG. 9, a liquid crystal display device according to the embodiment differs from the liquid crystal display device according to Embodiment 5 in that, ions 230d having a light diffusing function are contained in the protective layer 230c. Further, as for the liquid crystal display according to the embodiment, an anti-reflection film 260 may also be provided on the color filter layer 230, so as to reduce dazzle caused by external light.

The above Embodiments 2 to 7 are variants on the basis of Embodiment 1, and therefore, if no specific explanation is given, then descriptions to Embodiment 1 are also applicable for Embodiments 2 to 7. In addition, various features in Embodiments 1 to 7 may be combined with each other as well.

Descriptions made above are merely exemplary embodiments of the invention, but are not used to limit the protection scope of the invention. The protection scope of the invention is determined by attached claims.

What is claimed is:

1. A liquid crystal display device, comprising:
a backlight module and a display panel, two surfaces of the display panel being a light entering face and a light exiting face, respectively, the backlight module facing the light entering face of the display panel, and light that is emitted from the backlight module entering the display panel from the light entering face, wherein,
the display panel includes an array substrate disposed on the light entering face side, a color filter substrate disposed on the light exiting face side and a liquid crystal layer between the two substrates,
on the array substrate, there is provided a first polarizing plate,
the color filter substrate includes a base substrate, a second polarizing plate disposed on the light exiting face side of the base substrate and a color filter layer disposed on the light exiting face side of the second polarizing plate, and
the backlight module is a collimated backlight module;
wherein, the color filter layer includes color filters and black matrices that are disposed alternately in the in-plane direction of the color filter substrate and a protective layer that covers the color filters and the black matrices;
a collimation angle θ of the backlight module meets:

$$\theta = \tan^{-1}\left(\frac{p}{d1 + d2}\right)$$

wherein, d1 is the thickness of the base substrate, d2 is the thickness of the second polarizing plate, and p is the distance between centers of two adjacent black matrices;
wherein, the collimation angle θ of the collimated backlight module is within a range of ±17 degrees.

2. The liquid crystal display device as according to claim 1, wherein, the backlight module includes a light guide plate and a light source disposed on an end side of the light guide plate, on a light exiting face of the light guide plate, there is provided a grating, and the grating includes a plurality of strip-like structures that are disposed to be arranged parallel to each other with a set period Λ in a direction from the light source side to the opposite of the light source.

3. The liquid crystal display device according to claim 2, wherein, the color filter layer contains phosphors.

4. The liquid crystal display device according to claim 3, wherein, the set period Λ meets: 450 nm≥Λ≥200 nm.

5. The liquid crystal display device according to claim 1, wherein, over the color filter layer, there is further provided a light diffusion film having a light diffusing function, and particles having the light diffusing function are provided within the light diffusion film.

6. The liquid crystal display device according to claim 2, wherein, particles having a light diffusing function are further provided within the color filter layer.

7. The liquid crystal display device according to claim 6, wherein, the particles having the light diffusing function are contained in the color filters.

8. The liquid crystal display device according to claim 6, wherein, the particles having the light diffusing function are contained in the protective layer.

9. The liquid crystal display device according to claim 5, wherein, the light diffusion film has an interior haze and an exterior haze, and the exterior haze is less than 1%.

10. The liquid crystal display device according to claim 5, wherein, an interior haze value of the particles is in the range of 30% to 95%.

11. The liquid crystal display device according to claim 6, wherein, an interior haze value of the particles is in the range of 30% to 95%.

12. The liquid crystal display device according to claim 5, wherein, on the light diffusion film, there is provided an anti-reflection film.

13. The liquid crystal display device according to claim 8, wherein, on the protective layer, there is provided an anti-reflection film.

14. The liquid crystal display device according to claim 2, wherein, the backlight module includes a light guide plate and a light source disposed on an end side of the light guide plate, on a reflecting face which is in opposition to a light exiting face of the light guide plate, there is provided a grating, and the grating includes a plurality of strip-like structures that are disposed to be arranged parallel to each other with a set period Λ in a direction from the light source side to the opposite of the light source.

15. The liquid crystal display device according to claim 2, wherein, a width and a height of the gratings is configured such that the gratings have a plurality of diffraction regions with different extraction efficiencies of light along a certain direction, and for the extraction efficiency of the plurality of diffraction regions, the farther the region is apart from the light source, the higher the extraction efficiency is.

* * * * *